United States Patent [19]

Eichler

[11] Patent Number: 5,009,795
[45] Date of Patent: Apr. 23, 1991

[54] PROCESS FOR THE DEWATERING OF SOLIDS SUSPENDED IN WATER AND SCREW PRESS SEPARATOR THEREFOR

[75] Inventor: Dietrich Eichler, Groskarolinenfeld, Fed. Rep. of Germany

[73] Assignee: Fan Engineering GmbH, Sunninghausen, Fed. Rep. of Germany

[21] Appl. No.: 431,073

[22] Filed: Nov. 3, 1989

[30] Foreign Application Priority Data

Nov. 3, 1988 [DE] Fed. Rep. of Germany ....... 3837331
Mar. 4, 1989 [DE] Fed. Rep. of Germany ....... 3907046
Sep. 1, 1989 [DE] Fed. Rep. of Germany ....... 3929090

[51] Int. Cl.$^5$ .............................................. C02F 1/00
[52] U.S. Cl. ................................... 210/744; 210/770; 210/788; 210/197; 210/145; 210/415; 210/488; 100/117
[58] Field of Search ................ 210/97, 744, 413–415, 210/767, 770, 194, 197, 488, 489, 485, 787, 788; 100/117, 145–150

[56] References Cited

U.S. PATENT DOCUMENTS

| | | | |
|---|---|---|---|
| 3,235,087 | 2/1966 | Andrews et al. | 210/415 |
| 4,200,537 | 4/1980 | Lamort | 210/415 |
| 4,214,377 | 7/1980 | Maffet | 210/767 X |
| 4,260,488 | 4/1981 | Condolios | 210/259 |
| 4,291,619 | 9/1981 | Hunt et al. | 100/147 X |
| 4,309,291 | 1/1982 | Probstein et al. | 210/197 X |
| 4,347,134 | 8/1982 | Svehaug | 210/415 X |
| 4,358,371 | 11/1982 | Jameson | 210/415 |
| 4,520,724 | 6/1985 | Castarelli | 100/117 X |
| 4,818,403 | 4/1989 | Nagaoka | 210/488 |

OTHER PUBLICATIONS

"Verfahrenstechnik des Separienrens von Flussigmist" (Federal Research Institution for Agriculture, Braunschweig-Volkenrode, published in Grundl. Lantechnik, vol. 37 (1987), No. 3, pp. 98–107.

Primary Examiner—Charles Hart
Attorney, Agent, or Firm—Burns, Doane, Swecker & Mathis

[57] ABSTRACT

Solids contained in waste water are separated and dewatered by a separator comprising a cylindrical strainer basket and a rotary screw disposed in said basket. The screw terminates short of an outlet end of the basket. Waste water introduced into the separator is advanced by the screw until a solids slug is formed between a discharge end of the screw and a solids discharge formed by a cylindrical tube extending forwardly from the basket. About seventy to ninety-five percent of the slug is contained in the basket and is pressed laterally against a wall of the basket to promote the removal of water. The terminal portion of the screw tapers in order to maximize the compaction of the solids slug.

28 Claims, 4 Drawing Sheets

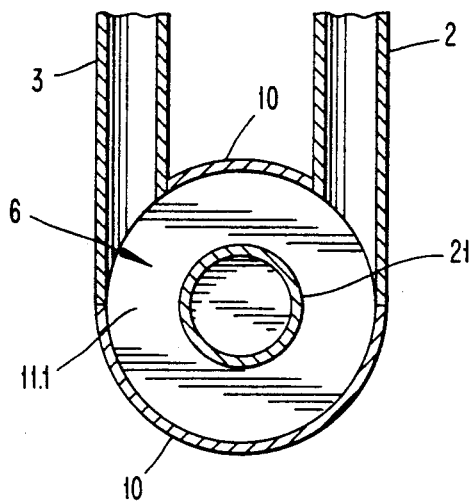
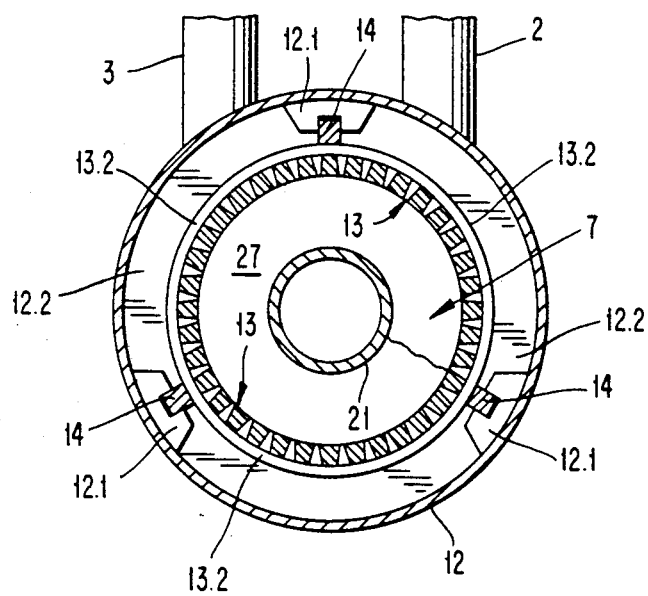
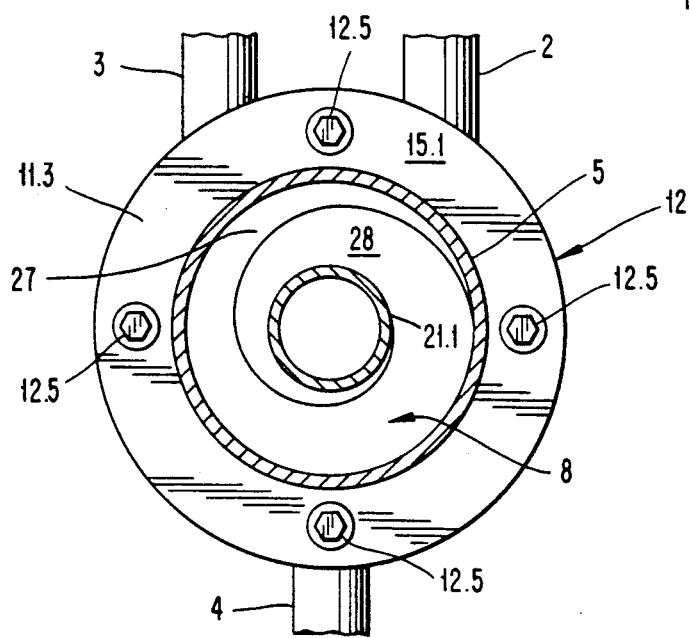

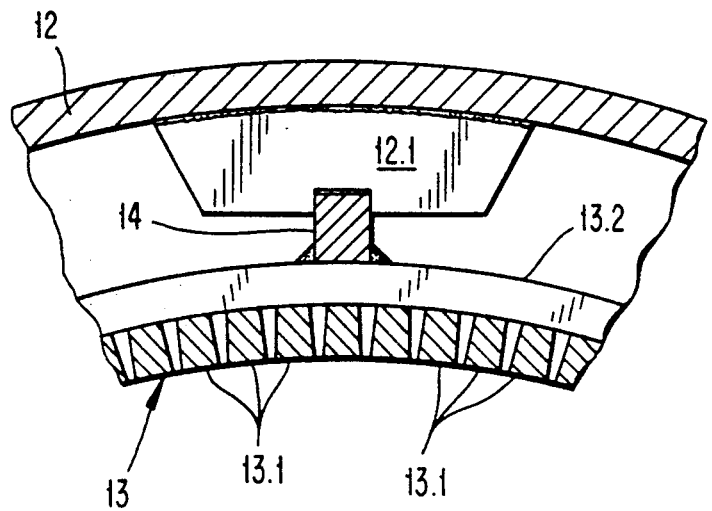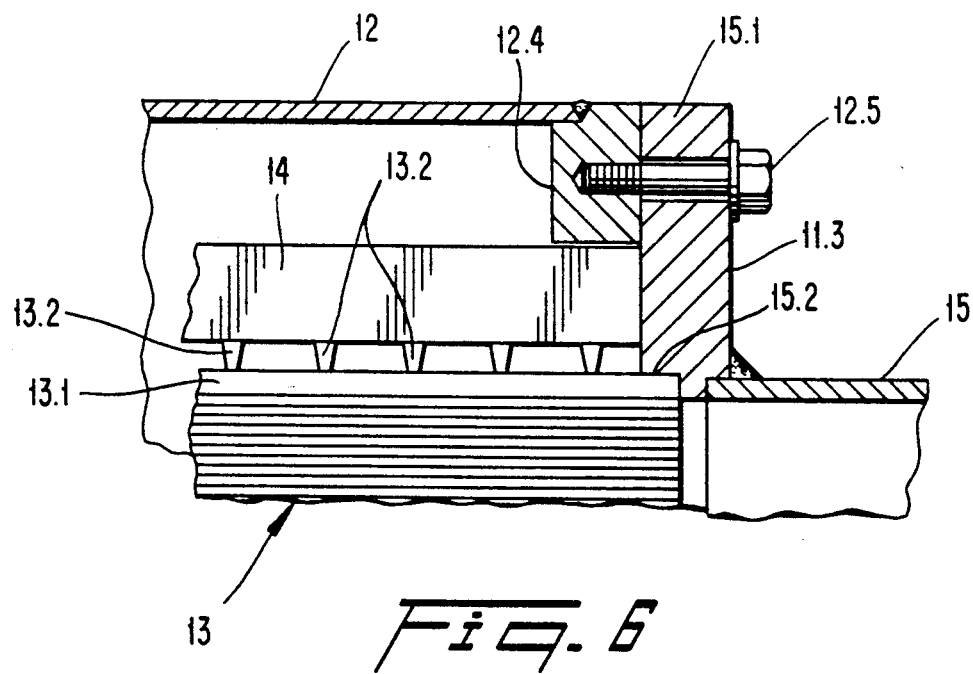

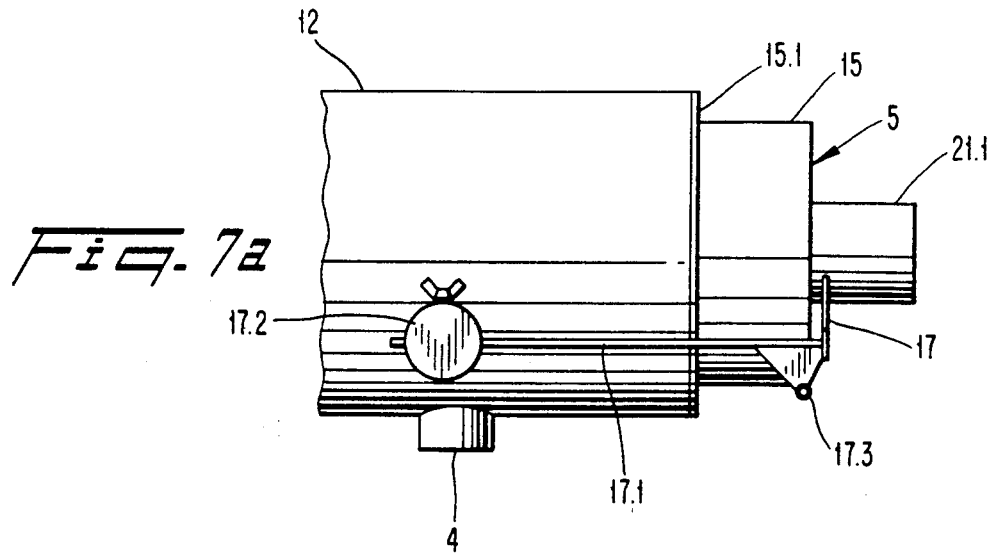
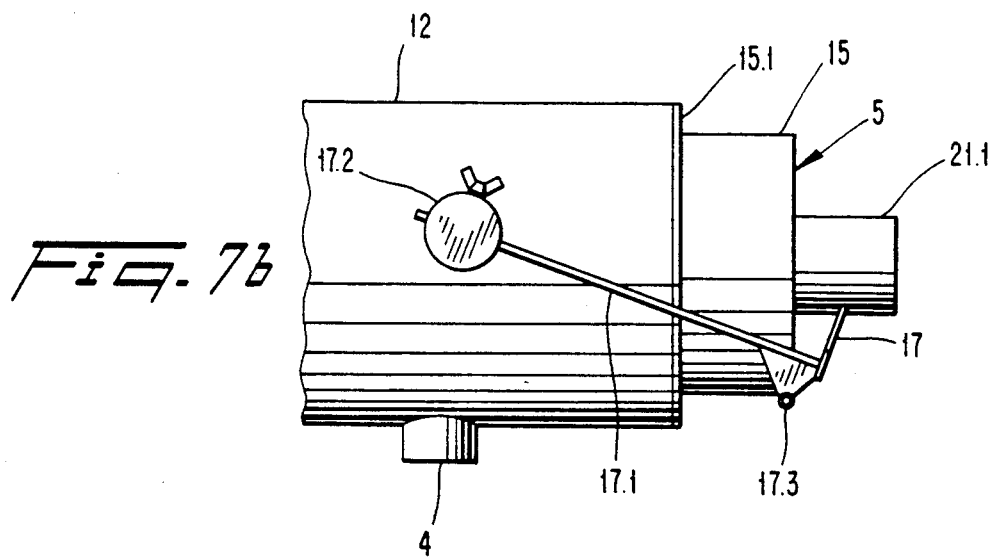
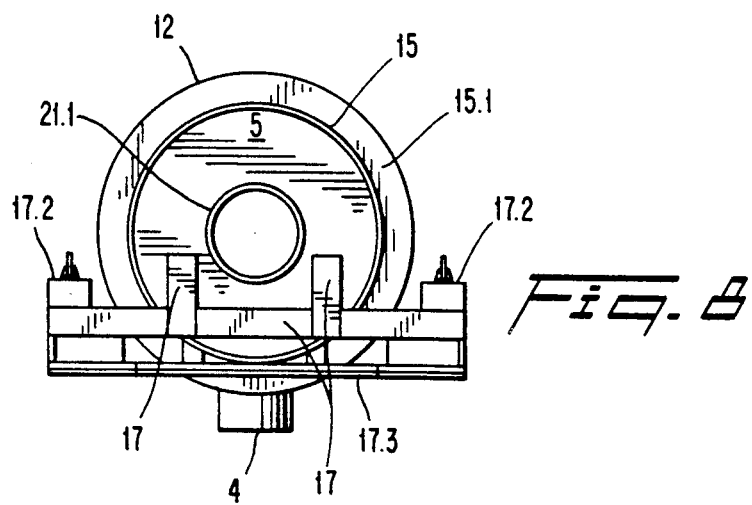

PROCESS FOR THE DEWATERING OF SOLIDS SUSPENDED IN WATER AND SCREW PRESS SEPARATOR THEREFOR

BACKGROUND AND OBJECTS OF THE INVENTION

The invention concerns a process and apparatus for the separation and dewatering of solids contained in waste waters in low concentrations of less than about 10%. Such solids may originate in animal intensive operations or in industrial processes for processing plants or animals or their parts, and mixed with fibers, for example, animal hairs or vegetable fibers.

In intensive animal husbandry the use of liquid manure removal has been found useful and is being used increasingly. A report of the Technological Institute of the Federal Research Institution for Agriculture, Braunschweig-Volkenrode, published in Grundl. Landtechnik, Vol. 37 (1987), No. 3, pg. 98-107, by K. Krause and R. Ahlers, describes the problem of liquid manure removal and the importance of the solid-liquid separation of the liquid manure, under the title of "Process Technology of the Separation of Liquid Manure". The advantages and disadvantages of individual devices are described and compared with each other.

One of the simplest machines for the separation of solids and liquids is the screw press or screw press separator wherein the screw turns and the housing interior become narrower toward the discharge for achieving a gradual compression of the solids being separated. The build up of the pressure by means of such narrowing is described in DE 26 36 372 and DE-OS 29 11 899. However, the operation of these arrangements in actual practice showed that all of the narrowing sections have a detrimental effect on the throughput, the field of application and the flexibility of the screw press separator. Whenever the quantity of the introduced suspension or its consistency varies, for example due to a variation of the content of fibrous solids, the solids are compressed in the narrowing (conical) areas, with the result that the press separator becomes clogged.

In DE-OS 27 00 542 and in DE 29 02 432 conical parts are eliminated from the screw press separator described. Only the passage through the housing wall to a strainer baskets of reduced diameter, so that this piece of the wall can build up a certain counter pressure. Although in this separator, with the narrowing that is to be considered ineffective, the uniform screw driven toward the discharge does dewater the suspension, there occurs no compression effect to obtain a high proportion of the dry substance, for example over 20% in pig liquid manure.

The object of the present invention is to broaden the field of application and improve the flexibility of the afore-described types of screw press separators, and increase the dry substance content of the solids.

SUMMARY OF THE INVENTION

The invention involves a change in the formation and shape of the solid slug, in order to obtain an operation free of interference of the machine, independently of different types of liquid manure and fluctuations in consistency. The solid slug is located in all stages of dewatering in a cylindrical strainer basket, and the screw press separator is configured so that no solids can accumulate between conical or tapering parts. The necessary counter pressure acting on the slug is built up by the internal stressing of the compressed elastic solids by friction against the walls the friction directed parallel to the direction of advancement of the slug. The slug begins to form rearwardly of the straining basket under a rising pressure which increases from the outlet of the helical screw to the end of the straining basket and then declines toward the solids discharge opening. This pressure rise in the part of the straining basket after the slug leaves the screw is essential for the further dewatering of the solids retaining on the straining surface. For the slug formation desired and the dewatering intended, a level of pressure in the screw press separator differing little from the pressure of the surrounding atmosphere is favorable; in order to obtain the necessary pressure equalization, such an equalization is effected through an equalizing line, which in order to prevent the discharge of waste water during start up is lead back into the waste water reservoir.

The solid slug is formed in the cylindrical straining basket which has straining gaps of 0.5 to 1.5 mm, and transported therethrough to be discharged through a cylindrical mouthpiece following (i.e., downstream of) the straining basket. The screw shaft extends past the mouthpiece, in the form of a hollow cylindrical body which supports the annular interior of the slug. The hollow cylindrical space extending from the discharge end of the screw to the outlet end of the straining basket has a length equal to the internal diameter of the strainer basket. In the case of suspensions low in dry substances, dewatered solids may be recycled in order to improve the formation of the filter cake.

The forces generated by the screw pressure in the elastic slug compress the slug between the walls of the cylindrical strainer basket, the mouthpiece, and the extended screw shaft to the extent that the waste water cannot penetrate through the solid slug or eject the latter. The extended cylindrical screw shaft, with a diameter 1 to 2 times the width of the annular gap between the straining basket and the screw shaft, fills the center of the slug and thereby prevents the penetration of the liquid into the axial area of the press slug, which otherwise is only under a slight compressive stress.

In order to prevent the pressuring of the water toward the discharge, thereby destroying the slug, the apparatus is arranged so that the hollow cylindrical solid slug is enclosed over 70-95% of its length by the strainer basket, i.e., by the portion of the strainer basket disposed downstream of the screw. The water squeezed out in that portion of the basket is able to escape through the slots of the straining basket and does not endanger the stability of the solid slug. At the solids discharge, the compression pressure again declines in the slug, so the dewatering ceases. The cylindrical mouthpiece provided is therefore arranged so that it encloses the slug over 5-30% of the slug length. By varying the length of the mouthpiece the stressing of the slug and thus the dry substance content may be adjusted.

The screw used for the formation of the solid slug passes in the area of the inlet to the basket with a constant spiral diameter. In this manner, jamming and clogging of the separated solids are prevented in the area of the screw.

The stability of the slug is in addition to its internal stresses largely a function of its homogeneity. In order to obtain a mixing effect during the formation of the slug, the screw tapers along approximately 180° to 360° of the screw before the screw discharge end is reached. This results in increased compression in the area of the screw shaft. In view of the otherwise low stress in the slug, this region is endangered by wetting.

Simultaneously, a uniform distribution of the axial and radial forces is obtained by the tapering configuration of the screw within the cylindrical strainer basket. The screw shaft extending beyond the mouthpiece is therefore able to perform the function of a bearing on the discharge side.

As at the start of the work of the press separator there is no slug in the machine. Prior to the activation of the motors of the waste water pump and of the separator, an auxiliary slug, for example of a foam material (styropor) is inserted from the discharge side and jammed in so that it is pushed out only by the pressure of the advancing solid from the press separator.

On the charging side of the separator the screw extends by 2 to 3 turns into a cylindrical housing section. It is achieved in this manner that the existing straining surface is fully loaded by a suspension that is already concentrated but still circulating.

The waste is normally fed into the screw press separator by means of a rotary pump, preferably in excess of what is needed. To recycle the excess, a return is provided directly adjacent to the feeder. The screw turns located between the inlet and the strainer basket in the feeder space limit the area of the overflow and thereby prevent the floating of solid particles accumulated in the wall are to be fed into the strainer basket, over the overflow of the separator. The inflow is thus controlled automatically by the screw press separator.

In the interest of a simple and robust construction of the machine, the screw shaft is mounted by means of a plug connection on the bearing of the drive. Furthermore, the strainer basket is installed within the screw press separator by holding rods located in an axially parallel manner on the outside of the strainer basket, in cooperation with holding projections on the inside of the jacket of the separator chamber; it is possible thereby to insert the strainer basket without any additional fastening into holders provided in the housing. At least one holding rod must be present to absorb torsional forces, preferably three holding rods spaced apart by 120° are provided.

At the outlet end of the strainer basket the ends of the strainer rods are inserted in an annular groove of the mouthpiece flange. The strainer rods are thereby supported and centered between the mouthpiece and the strainer basket.

For the manual setting of the length of the mouthpiece affecting the dry substance content of the solids, an axially displaceable and clampable, thin walled tubular extension can be slid over the stationary mouthpiece, the extension to be chosen from among a number of tubes of different lengths. If an extension, displaceable telescope-like relative to the tube of the mouthpiece is provided, continuous regulation is possible; if in addition the extension is equipped with a drive, regulation may be rendered automatic.

A tendency for the screw to fluctuate due to differences in the consistency of the waste water may be counteracted by regulating the velocity of the slug discharge. In that regard, there is provided in the lower area of the solids discharge of the cylindrical mouthpiece, a discharge control device situated outside of the discharge opening. The control device is capable of covering a portion of the area of the discharge between 0% of that area on the one hand, and approximately 10 to 25%, on the other hand. Conveniently, a lever with tabs lying in front of the outlet opening is provided with a reset force acting upon the lever. This reset force is produced advantageously by a weight and the force may be made variable by varying the weight and/or the length of the lever arm. Solids being discharged cause the tabs to be pivoted out and gradually uncover the discharge opening until the entire annular surface of the slug is released.

In a possible automatic regulation of the length of the mouthpiece acting on the dry substance content of the solids, the thin-walled cylinder could be displaced by a drive, controlled by the power uptake of the motor of the screw press separator.

If the slug becomes too soft due to an interference, there arises the risk of a break through of the suspension on the solids discharge side. This process is indicated by the decline of the power output of the motor of the screw press separator below a predetermined value, so that the feeder pump and the separator may be automatically deactivated.

BRIEF DESCRIPTION OF THE DRAWINGS

The objects and advantages of the invention will become apparent from the following detailed description of a preferred embodiment thereof in connection with the accompanying drawings in which like numerals designate like elements, and in which:

FIG. 2 is a cross-section of the screw press separator taken along the line II—II of FIG. 1;

FIG. 3 is a cross-section of the screw press separator taken along the line III—III in FIG. 1;

FIG. 4 is a cross-section of the screw press separator taken along the line IV-IV in FIG. 1;

FIG. 5 is a fragmentary cross-sectional view depicting a torsional securing means for the strainer basket;

FIG. 6 is a fragmentary longitudinal sectional view depicting an axial support for the strainer basket;

FIGS. 7a and 7b are side elevational views depicting a discharge control; FIG. 7a depicts the discharge control closed, and FIG. 7b depicts the discharge control partially open; and FIG. 8 is an end view of the discharge control.

DETAILED DESCRIPTION OF A PREFERRED EMBODIMENT OF THE INVENTION

Figure 1:
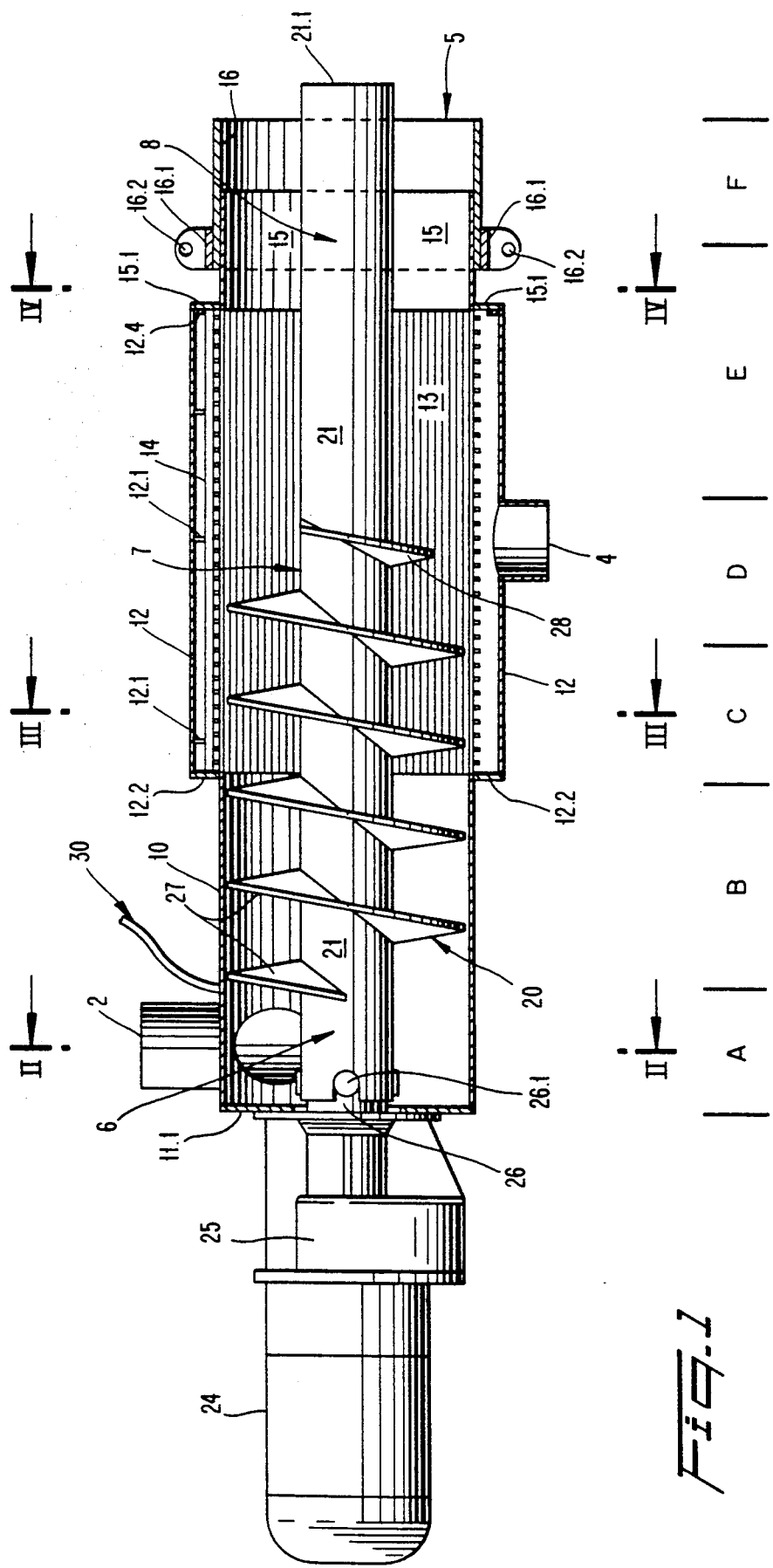
FIG. 1 is a longitudinal section through a screw press separator according to the invention.

Depicted in FIG. 1 is an apparatus for the conversion of a liquid/solids mixture into a liquid and a solid phase according to the invention. The apparatus includes a zone A for the inflow and overflow of the suspension, a feed control zone B, a circulating water zone C, a zone D of rising pressure with mixing and homogenizing effects, a zone E for the dewatering of the solid slug, and a solids discharge zone F.

Liquid manure to be separated arrives from a liquid manure pump through a pipeline opening into manure inlet 2 in an annular inflow space 6 of a screw press separator 1. The liquid manure is introduced in excess and fills the space 6 and the excess part is returned to the manure reservoir. This return moves the manure in the reservoir and prevents the sedimentation of the solids contained in the liquid manure. A screw press 20 driven by a drive motor 24 by means of a gearing 25 seizes a portion of the liquid manure corresponding to the intake capacity of the screw press and transports it in a self-regulating manner by means of the helical screw 27 to a separation chamber 7. Initially, the stationary wall of the housing in the inlet space 6 permits the undisturbed formation of a layer of solids adjacent to the housing wall, which layer then passes into the separation chamber 7 in the form of a growing filter cake and finally exits the helical screw as a solid slug filling the volume of an annular space within a cylindrical strainer basket 13.

The screw press 20 transports the solid slug through the strainer basket to the discharge chamber 8, while the pressure is rising toward the terminal end 28 of the screw 27. During that stage, there occurs a dewatering of the solids accumulated in the slug. This slug is moved to the discharge opening 5 through a cylindrical mouthpiece 15 which projects forwardly from an outlet end of the strainer basket 13. The slug travels along the screw shaft 21, the end 21.1 of the shaft projecting forwardly past the discharge opening. Under the action of the pressure generated by the screw press, the slug produced in this manner is pushed forwardly out of the discharge opening 5.

The solid slug begins at the discharge end of the spiral which is at a location spaced rearwardly of the outlet end of the strainer basket; the slug ends at the slug discharge opening defined by the tube 15 (or by a mouthpiece extension tube 16 if the latter is used). About 70 to 95% of the solid slug is situated in the strainer basket and the remainder, i.e., 30 to 5% is situated in the mouthpiece 15 or 15-16. The forces generated by the screw pressure compress the elastic slug between the walls of the cylindrical strainer basket, the mouthpiece and the extended screw shaft to the extent that the waste water cannot penetrate through the solid slug or eject the latter. The extended cylindrical screw shaft fills the center of the slug and thereby prevents the penetration of the liquid into the axial area of the press slug, which otherwise is only under a slight compressive stress.

In order to prevent the pressuring of the water toward the discharge, thereby destroying the slug, the apparatus is arranged so that about 70 to 95% of the length of the hollow cylindrical solid slug is enclosed by the strainer cylinder. The water squeezed out is thus able to escape through the slots of the strainer basket and does not endanger the stability of the solid slug. In the region of the solids discharge, the compression pressure again declines in the slug, so the dewatering ceases. The cylindrical mouthpiece encloses the slug over 5 to 30% of its length. By varying the length of the mouthpiece the stressing of the slug and thus the dry substance content may be adjusted.

The stability of the slug is, in addition to its internal stresses, largely a function of slug homogeneity. In order to obtain a mixing effect during the formation of the slug, the last 180° to 360° of the screw tapers toward the screw shaft. This results in increased compression of the slug adjacent the region of the screw shaft. Simultaneously, a uniform distribution of the axial and radial forces is obtained by the tapering configuration of the screw. The screw shaft extending past the mouthpiece is therefore able to perform the function of a bearing on the discharge side.

In one actual operation, a screw press separator according to the invention was used for the separation of solids from liquid pig manure. Start-up was achieved by passing a styropor material through the separator as described earlier. Thereafter, the liquid pig manure was introduced which attained a throughput volume of 4 m³/h with a dry substance content of the liquid pig manure of 5.2%. This screw press separator had a 500 mm long strainer basket defining a cylindrical passage, and a mouthpiece length of 260 mm. The strainer had a gap width of 0.7 mm; the screw press had a spiral rise of 100 mm with five turns, and the screw shaft had a diameter of 100 mm. The slug being formed had a total length of 400 mm, of which 280 mm (i.e., 70 percent) was located in the part of the strainer basket following the discharge or terminal end of the helical screw, and 120 mm (i.e., 30 percent) of the slug was located in the mouthpiece. The driving power required for the operation of the screw press separator amounted to 2.2 kW with a screw rpm of 30. Under these operating conditions, 220 kg/h solids were separated with a dry substance content of 32%; the run-off water of 3.78 m³/h had a residual solids content of 3.7% relative to the dry substance. This corresponds to a separation efficiency of 32.7% relative to the solids. An auxiliary styropor slug needed for the start-up had the appropriate hole diameter of 110 mm, an external diameter of 260 mm and a length of 300 mm. The overflow was located about 1.5 m above the machine inlet and conducted an excess portion of the input volume of the waste water was conducted by the return 3 to the liquid manure pit, while the relatively high quantity is adequate for the homogenization of the pump pit of 10 to 20 m³.

The press screw 20 is connected by means of a simple plug-in joint with a drive shaft 26 of the drive comprising the motor 24 and the gearing 25 mounted on a flange 11.1 of a screw press housing 10. The output shaft 27, over which the hollow screw shaft 21 is inserted, is equipped with drive pins 26.1 engaging corresponding recesses on the end of the screw shaft 21. The helical screw 27 begins in the inlet chamber 6, with which both the waste water inlet 2 and the waste water return 3 (FIG. 2) communicate. Two spiral turns of the screw 27 are located in the front of (i.e., to the left of) the separating chamber 7 which contains the cylindrical strainer basket 13.

The strainer basket 13 is surrounded on the outside by a separator chamber mantle 12 which forms an annular space in which the water separated by the strainer is collected and drained through a water outlet 4. The separator chamber mantle 12 has a flange 12.2 connected with the housing 10 adjacent the inlet chamber 6. The chamber mantle 12 also includes a ring 12.4 connected with a flange 15.1 of the cylindrical mouthpiece 15 (see FIG. 6). The screw 27 terminates upstream of the outlet end of the strainer basket 13, with the end region of the screw being in the form of a tapering outlet helix 28.

The solids densifying due to the dewatering are transported by the screw toward the terminal end of the screw, and are accumulated within the last screw turns and shaped into a slug. The increasing pressure leads to additional dewatering and deposition of solids onto the slug. By means of the tapering screw outlet helix 28, which tapers for about 360° toward the screw shaft, the solids are mixed prior to their deposition onto the slug, and are compressed more in the vicinity of the screw shaft whereby a uniform axial and radial pressure is produced. In this manner, the solids slug is able to center and support the press screw 20.

Due to the continuously arriving solids volume, the slug is pressured through the hollow cylindrical zone of the discharge chamber 8 between the mouthpiece 15 and the projecting end 21.1 of the screw shaft 21 and passes through the mouthpiece 15 into the area of the solids discharge opening 5. In order to adjust the length of the slug to the prevailing conditions, a displaceable and securable extension 16 is set onto the tube of the cylindrical mouthpiece 15. That extension is releasably clamped to the tube by means of a tightening strap 16.1 and screws 1.2.

FIG. 2 shows a cross-section of the inlet chamber 6 through the waste water inlet 2 and the waste water return 3, with a view of the end flange 11.1 on the drive side. The screw shaft 21 is located concentrically in the inlet chamber 6. FIG. 3 shows a cross-section through the separator chamber 7 which contains the strainer basket 13. The strainer basket comprises axially extending parallel strainer rods 13.1 (FIG. 5). The strainer rods are held together in circumferentially spaced relationship by supporting rings 13.2, which may be of annular or spiral form. On the outside of the supporting rings 13.2 axially extending holding bars 14 are attached which engage recesses defined by holding projections 12.1 located on the inside of the separator mantle 12. The bars 14 are able to absorb torsional moments and transmit them to the housing. Ends of the bars 14 engage a radially inner surface of the ring 12.4 to aid in centering the basket.

In the screw press separator shown, the strainer basket 13 is equipped with three holder bars 14 circumferentially offset by 120°. To support the strainer rods 13.1, the ends of the rods are held in an annular groove 15.2 of the mouthpiece flange 15.1 of the mouthpiece 15, thereby centering the strainer basket 13 relative to the mouthpiece 15. The screw shaft 21 is located within the strainer basket 13.

FIG. 4 shows a section through the discharge chamber 8 with a view of the mouthpiece flange 15. Screws 12.5 connect the mouthpiece flange 15.1 to the inner ring 12.4 (FIG. 6). The mouthpiece 15 is arranged concentrically with the separator chamber 12. The screw shaft with its projecting shaft end 21.1 is located inside of the mouthpiece.

To stabilize the screw press separator against vibrations and fluctuations which could otherwise result from the differences in the solids content of the waste water, the velocity of the slug is regulated by a discharge control device depicted in FIGS. 7a, 7b, 8. That device uncovers the discharge opening when fully open and covers up to approximately 10 to 25% of that opening, when fully closed (FIG. 7a).

The regulating device comprises a lever 17.1 carrying tabs 17 that are able to partially cover the outlet opening. A reset force acting upon the lever is produced by a weight 17.2. That force tends to move the tabs to a position blocking the discharge opening (FIG. 7a). The force may be changed by varying the magnitude of the weight and/or the length of the lever arm. Solids being discharged are acted upon by the tabs 17.1 which resist travel of the slug. Accordingly, the slug becomes compacted and eventually causes the lever to be pivoted outwardly to an unblocking position until the slug is fully released for discharge.

It is preferable that the interior of the separator be maintained at about atmospheric pressure. This is achieved by a pressure equalization line 30 which communicates with atmosphere. Preferably, the line 30 extends into the reservoir so that any flow of waste water occurring therethrough will travel back to the reservoir.

When waste waters low in solids content are dewatered, those dewatered solids can be recycled back to the inlet 2 and dewatered again.

During a dewatering operation, the power output of the drive motor is monitored. If that output fails to reach a predetermined minimum value, signifying that the slug is too soft, the motor is automatically shut down.

Although the present invention has been described in connection with a preferred embodiment thereof, it will be appreciated by those skilled in the art that modifications, additions, deletions, and substitutions may be made without departing from the spirit and scope of the invention as defined in the appended claims.

What is claimed is:

1. A process for separating and dewatering solids contained in waste water in a concentration therein of less than about ten percent, comprising the steps of:
   introducing said waste water into a space defined by a housing, a cylindrical strainer basket aligned with an outlet end of said housing, and cylindrical tube means aligned with an outlet end of said strainer basket, said strainer basket being apertured for the passage of waste, said tube means defining a solids discharge opening at a terminal end thereof, said tube means comprising a cylindrical mouthpiece and a cylindrical mouthpiece extension telescopingly adjustably connected to said mouthpiece, said waste water being introduced into a portion of said space defined by said housing,
   rotating a screw disposed in said space and having a discharge end terminating short of said outlet end of said strainer basket, to advance said waste water into said strainer basket whereby water separated from said solids passes laterally through said strainer basket, and a solid slug is formed which extends from said discharge end of said screw to said solids discharge laterally against an inner surface of said cylindrical strainer basket while being advanced therethrough, and
   adjusting said mouthpiece extension relative to said mouthpiece to vary the length of said tube means for varying the resistance to travel of said slug, said mouthpiece extension being adjusted such that from five to thirty percent of said slug is disposed in said tube means.

2. A process according to claim 1, wherein said slug passes through an inner diameter of said strainer basket and then through an inner diameter of said tube means which inner diameter is no less than an internal diameter of the strainer basket.

3. A process according to claim 1, wherein said introducing step includes introducing waste water in excess of what is needed and removing said excess waste water back to a reservoir in a manner agitating waste water in the reservoir, and further comprising the steps of maintaining the pressure in said space at about atmospheric pressure by a pressure equalizing conduit extending between said space and said reservoir, and rotating said screw by means of a motor the driving power of which is monitored, said motor being deactivated if a minimum driving power is not maintained.

4. A screw press separator for separating and dewatering solids contained in waste water in a concentration therein of less than about ten percent, comprising:
   a housing including an inlet for receiving waste water, a cylindrical strainer basket extending forwardly from said housing said strainer basket being apertured for the passage of separated water, cylindrical non-apertured tube means extending forwardly from an outlet end of said strainer basket and defining a solids discharge opening at a terminal end thereof, an internal diameter of said tube means being no less than an internal diameter of said strainer basket, a press screw member disposed in a space defined by said housing, said strainer basket, and said tube means, said press screw member including a shaft and a screw affixed to an outer periphery of said shaft, said screw beginning in said housing at a location rearwardly of said strainer basket and terminating within said strainer basket whereby a discharge end of said screw is disposed rearwardly of said outlet end of said strainer basket, and a motor for driving said press screw member for advancing waste water forwardly within said space and through said discharge opening, whereby a solid slug is formed which extends from said discharge end of said screw to said solids discharge opening, a distance from said discharge end of said screw to said outlet end of said strainer basket being at least equal to said inner diameter of said strainer basket, such that from about seventy to ninety-five percent of said solid slug is situated within said strainer basket, said tube means comprising a cylindrical mouthpiece and a cylindrical mouthpiece extension telescopingly adjustably connected to said mouthpiece for varying the length of said tube means, whereby from five to thirty percent of said slug is disposed in said tube means.

5. A separator according to claim 4, wherein a gap exists between said shaft and an inner surface of said strainer basket, a diameter of said shaft being from one to two times said gap.

6. A separator according to claim 4, wherein at least the last one-hundred and eighty degrees of said screw tapers toward said shaft.

7. A separator according to claim 4, wherein said motor includes an output shaft, said shaft of said screw and said output shaft forming a plug-in connection for said shaft of said screw.

8. A separator according to claim 4, wherein said strainer basket comprises a plurality of parallel bars spaced apart circumferentially by a distance equal to approximately 0.5 to 1.5 mm.

9. A separator according to claim 4, including a chamber wall surrounding said strainer basket, said chamber wall including at least one projection defining a recess, said strainer basket including at least one holding rod received in said recess to absorb torsional forces applied to said strainer basket.

10. A separator according to claim 19, wherein said chamber wall includes an inner ring, said tube means releasably fastened to said inner ring, said inner ring including recesses receiving ends of said holding bars.

11. A process for separating and dewatering solids contained in waste water in a concentration therein of less than about ten percent, comprising the steps of:

introducing said waste water into a space defined by a housing, a cylindrical strainer basket aligned with an outlet end of said housing, and cylindrical tube means aligned with an outlet end of said strainer basket and defining a solids discharge opening, said waste water being introduced into a portion of said space defined by said housing, rotating a screw disposed in said space and having a discharge end terminating short of said outlet end of said strainer basket, to advance said waste water into said strainer basket whereby water separated from said solids passes laterally through said strainer basket, and a solid slug is formed which extends from said discharge end of said screw to said solids discharge opening of said tube means, said slug being pressed laterally against an inner surface of said cylindrical strainer basket while being advanced therethrough, positioning a lever-mounted barrier at a longitudinal location outside of said solids discharge opening where an emerging slug is unsupported around its outer periphery, said barrier being movable between a blocking position in which it blocks from 10 to 25 percent of said solids discharge opening, and an unblocking position in which it blocks no part of said solids discharge opening, biasing said barrier toward said blocking position by a counterweight adjustably positionable along said lever, and adjusting the position of said counterweight to vary an initial force applied by the barrier to a slug to vary the extent to which the slug is compacted.

12. A process according to claim 11, wherein said slug passes through an inner diameter of said strainer basket and then through an inner diameter of said tube means which inner diameter is no less than an internal diameter of the strainer basket.

13. A process according to claim 11, wherein said introducing step includes introducing waste water in excess of what is needed and removing said excess waste water back to a reservoir in a manner agitating waste water in the reservoir, and further comprising the steps of maintaining the pressure in said space at about atmospheric pressure by a pressure equalizing conduit extending between said space and said reservoir, and rotating said screw by means of a motor the driving power of which is monitored, said motor being deactivated if a minimum driving power is not maintained.

14. A process for separating and dewatering solids contained in waste water in a concentration therein of less than about ten percent, comprising the steps of:

introducing said waste water from a reservoir into a space defined by a housing, a cylindrical strainer basket aligned with an outlet end of said housing, and cylindrical tube means aligned with an outlet end of said strainer basket, said waste water being introduced into a portion of said space defined by said housing, rotating a screw disposed in said space and having a discharge end terminating short of said outlet end of said strainer basket, to advance said waste water into said strainer basket whereby water separated from said solids passes laterally through said strainer basket, and a solid slug is formed which extends from said discharge end of said screw to a solids discharge of said tube means, said slug being pressed laterally against an inner surface of said cylindrical strainer basket while being advanced therethrough, said introducing step including introducing waste water in excess of what is needed and removing said excess waste water back to said reservoir in a manner agitating waste water in said reservoir.

15. A process according to claim 14, wherein said slug passes through an inner diameter of said strainer basket and then through an inner diameter of said tube means which inner diameter is no less than an internal diameter of the strainer basket.

16. A process according to claim 14, further comprising the steps of maintaining the pressure in said space at about atmospheric pressure by a pressure equalizing conduit extending between said space and said reservoir, and rotating said screw by means of a motor the driving power of which is monitored, said motor being deactivated if a minimum driving power is not maintained.

17. A process for separating and dewatering solids contained in waste water in a concentration therein of less than about ten percent, comprising the steps of:
   introducing said waste water into a space defined by a housing, a cylindrical strainer basket aligned with an outlet end of said housing, and cylindrical tube means aligned with an outlet end of said strainer basket, said waste water being introduced into a portion of said space defined by said housing,
   rotating a screw disposed in said space and having a discharge end terminating short of said outlet end of said strainer basket, to advance said waste water into said strainer basket whereby water separated from said solids passes laterally through said strainer basket, and a solid slug is formed which extends from said discharge end of said screw to a solids discharge of said tube means, said slug being pressed laterally against an inner surface of said cylindrical strainer basket while being advanced therethrough, and
   maintaining the pressure in said space at about atmospheric pressure by a pressure equalizing conduit extending between said space and a waste water reservoir.

18. A process according to claim 17, wherein said slug passes through an inner diameter of said strainer basket and then through an inner diameter of said tube means which inner diameter is not less than an internal diameter of the strainer basket.

19. A process according to claim 17, wherein said introducing step includes introducing waste water in excess of what is needed and removing said excess waste water back to a reservoir in a manner agitating waste water in the reservoir, and further comprising the step of rotating said screw by means of a motor the driving power of which is monitored, said motor being deactivated if a minimum driving power is not maintained.

20. A process for separating and dewatering solids contained in waste water in a concentration therein of less than about ten percent, comprising the steps of:
   introducing said waste water into a space defined by a housing, a cylindrical strainer basket aligned with an outlet end of said housing, and cylindrical tube means aligned with an outlet end of said strainer basket, said waste water being introduced into a portion of said space defined by said housing,
   rotating a screw disposed in said space and having a discharge end terminating short of said outlet end of said strainer basket, to advance said waste water into said strainer basket whereby water separated from said solids passes laterally through said strainer basket, and a solid slug is formed which extends from said discharge end of said screw to a solids discharge of said tube means, said slug being pressed laterally against an inner surface of said cylindrical strainer basket while being advanced therethrough, and
   recycling dewatered solids from said solids discharge to said inlet.

21. A process according to claim 20, wherein said slug passes through an inner diameter of said strainer basket and then through an inner diameter of said tube means which inner diameter is no less than an internal diameter of the strainer basket.

22. A process according to claim 20, wherein said introducing step includes introducing waste water in excess of what is needed and removing said excess waste water back to a reservoir in a manner agitating waste water in the reservoir, and further comprising the steps of maintaining the pressure in said space at about atmospheric pressure by a pressure equalizing conduit extending between said space and said reservoir, and rotating said screw by means of a motor the driving power of which is monitored, said motor being deactivated if a minimum driving power is not maintained.

23. A process for separating and dewatering solids contained in waste water in a concentration therein of less than about ten percent, comprising the steps of:
   introducing said waste water into a space defined by a housing, a cylindrical strainer basket aligned with an outlet end of said housing, and cylindrical tube means aligned with an outlet end of said strainer basket, said waste water being introduced into a portion of said space defined by said housing, and
   rotating a screw disposed in said space and having a discharge end terminating short of said outlet end of said strainer basket, to advance said waste water into said strainer basket whereby water separated from said solids passes laterally through said strainer basket, and a solid slug is formed which extends from said discharge end of said screw to a solids discharge of said tube means, said slug being pressed laterally against an inner surface of said cylindrical strainer basket while being advanced therethrough,
   said screw being rotated by a motor, the driving power of which is monitored, and said motor is deactivated if a minimum driving power is not maintained.

24. A process according to claim 23, wherein said slug passes through an inner diameter of said strainer basket and then through an inner diameter of said tube means which inner diameter is no less than an internal diameter of the strainer basket.

25. A process according to claim 24, wherein said introducing step includes introducing waste water in excess of what is needed and removing said excess waste water back to the reservoir in a manner agitating waste water in the reservoir, and further comprising the step of maintaining the pressure in said space at about atmospheric pressure by a pressure equalizing conduit extending between said space and said reservoir.

26. A screw press separator for separating and dewatering solids contained in waste water in a concentration therein of less than about ten percent, comprising:
   a housing including an inlet for receiving waste water,
   a cylindrical strainer basket extending forwardly from said housing for the passage of separated water, cylindrical tube means extending forwardly from an outlet end of said strainer basket and defining a solids discharge opening, an internal diameter of said tube means being no less than an internal diameter of said strainer basket, a press screw member disposed in a space defined by said housing, said strainer basket, and said tube means, said press screw member including a shaft and a screw affixed to an outer periphery of said shaft, said screw beginning in said housing at a location rearwardly of said strainer basket and terminating within said strainer basket whereby a discharge end of said screw is disposed rearwardly of said outlet end of said strainer basket, a motor for driving said press screw member for advancing waste water forwardly within said space and through said discharge opening, whereby a solid slug is formed which extends from said discharge end of said screw to said solids discharge opening, a distance from said discharge end of said screw to said outlet end of said strainer basket being such that from about seventy to ninety-five percent of said solid slug is situated within said strainer basket, a lever-mounted barrier positioned at a longitudinal location outside of said solids discharge opening where an emerging slug is unsupported around its outer periphery, said barrier being movable between a blocking position in which it blocks from ten to twenty-five percent of said solids discharge opening, and an unblocking position in which it blocks no part of said discharge opening, and a counterweight mounted on said lever for biasing said barrier toward said blocking position, said counterweight being adjustably positionable on said lever to vary an initial force applied by the barrier to a slug to vary the extent to which the slug is compacted.

27. A screw press separator for separating and dewatering solids contained in waste water in a concentration therein of less than about ten percent, comprising:

a housing including an inlet for receiving waste water, a cylindrical strainer basket extending forwardly from said housing for the passage of separated water, cylindrical tube means extending forwardly from an outlet end of said strainer basket and defining a solids discharge, an internal diameter of said tube means being no less than an internal diameter of said strainer basket, a press screw member disposed in a space defined by said housing, said strainer basket, and said tube means, said press screw member including a shaft and a screw affixed to an outer periphery of said shaft, said screw beginning in said housing at a location rearwardly of said strainer basket and terminating within said strainer basket whereby a discharge end of said screw is disposed rearwardly of said outlet end of said strainer basket, a motor for driving said pres screw member for advancing waste water forwardly within said space and through said discharge, whereby a solid slug is formed which extends from said discharge end of said screw to said solids discharge, a distance from said discharge end of said screw to said outlet end of said strainer basket being such that from about seventy to ninety-five percent of said solid slug is situated within said strainer basket, said strainer basket comprising a plurality of parallel bars oriented parallel to an axis about which said screw member rotates, said bars spaced apart circumferentially by a distance of approximately 0.5 to 1.5 mm, said strainer basket further including at least three holding rods operably connected to said bars and located radially outside of said bars, said holding rods oriented parallel to said axis, and a chamber wall surrounding said strainer basket, said chamber wall including at least one projection defining at least three holding rods received in said recesses to absorb torsional forces applied to said strainer basket.

28. A screw press separator for separating and dewatering solids contained in waste water in a concentration therein of less than about ten percent, comprising:

a housing including an inlet for receiving waste water, a cylindrical strainer basket extending forwardly from said housing for the passage of separated water, cylindrical tube means extending forwardly from an outlet end of said strainer basket and defining a solids discharge, an internal diameter of said tube means being no less than an internal diameter of said strainer basket, a press screw member disposed in a space defined by said housing, said strainer basket, and said tube means, said press screw member including a shaft and a screw affixed to an outer periphery of said shaft, said screw beginning in said housing at a location rearwardly of said strainer basket and terminating within said strainer basket whereby a discharge end of said screw is disposed rearwardly of said outlet end of said strainer basket, a motor for driving said press screw member for advancing waste water forwardly within said space and through said discharge, whereby a solid slug is formed which extends from said discharge end of said screw to said solids discharge, a distance from said discharge end of said screw to said outlet end of said strainer basket being at least equal to said inner diameter of said strainer basket, such that from about seventy to ninety-five percent of said solid slug is situated within said strainer basket, and a chamber wall surrounding said strainer basket, said chamber wall including at least one projection defining a recess, said strainer basket including at least one holding rod received in said recess to absorb torsional forces applied to said strainer basket, said chamber wall including an inner ring, said tube means releasably fastened to said inner ring, said inner ring including recesses receiving ends of said holding bars.

* * * * *